Figure 1:
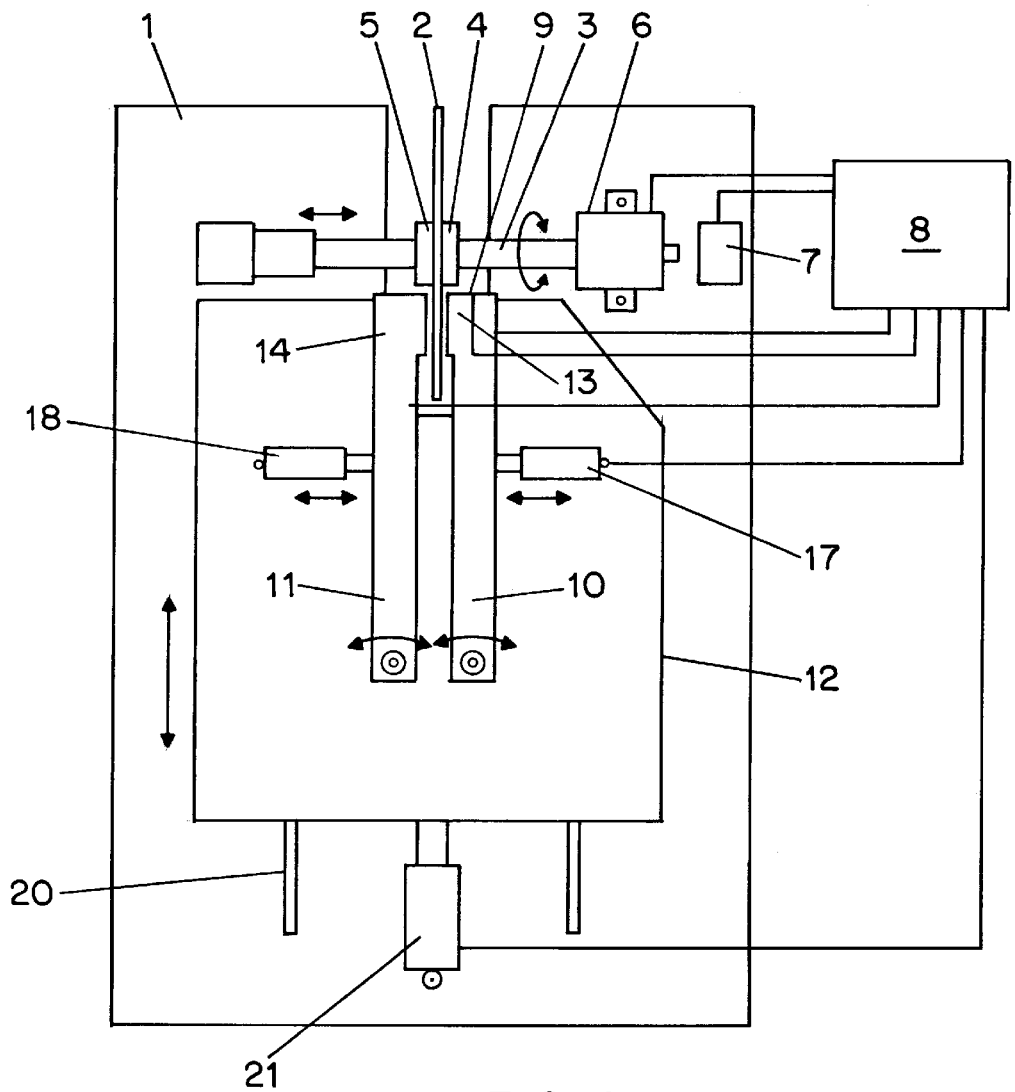

United States Patent

Rautio et al.

[11] Patent Number: 6,067,879
[45] Date of Patent: May 30, 2000

[54] PROCEDURE AND APPARATUS FOR STRAIGHTENING A CIRCULAR-SAW BLADE INTO A DESIRED SHAPE

[75] Inventors: Kauko Rautio; Kai Rautio, both of Mäntyharju, Finland

[73] Assignee: Veisto-Rakenne Rautio Oy, Mäntyharju, Finland

[21] Appl. No.: 08/973,357

[22] PCT Filed: May 28, 1996

[86] PCT No.: PCT/FI96/00302

§ 371 Date: Feb. 25, 1998

§ 102(e) Date: Feb. 25, 1998

[87] PCT Pub. No.: WO96/38251

PCT Pub. Date: Dec. 5, 1996

[30] Foreign Application Priority Data

Jun. 2, 1995 [FI] Finland ................................ 952706

[51] Int. Cl.<sup>7</sup> ................................ B23D 63/18
[52] U.S. Cl. .................... 76/25.1; 76/26; 76/27
[58] Field of Search ................. 76/27, 25.1, 26; 72/176, 226

[56] References Cited

U.S. PATENT DOCUMENTS

| | | | |
|---|---|---|---|
| 3,964,348 | 6/1976 | Dawson | 76/26 |
| 4,085,630 | 4/1978 | Williams | 76/27 |
| 4,138,908 | 2/1979 | Kampmann et al. | 76/26 |
| 5,269,205 | 12/1993 | Oppliger | 76/27 |
| 5,522,283 | 6/1996 | Brown | 76/27 |

FOREIGN PATENT DOCUMENTS 0720884 7/1996 European Pat. Off. .

Primary Examiner—Douglas D. Watts
Attorney, Agent, or Firm—Baker Botts L.L.P.

[57] ABSTRACT

Procedure for straightening a circular-saw blade (2), in which procedure the blade (2) is mounted on a shaft (3). The geometry of the blade is measured, the measured values are compared with reference values, deformations in the blade are straightened by means of blade treating elements (10, 11, 12, 13, 14, 15, 16, 23, 24), the blade is tensioned by means of working devices (13, 14), the blade (2) is rotated, lateral forces are applied to the blade (2), the effect of the forces on the blade (2) is measured while the blade is rotating, the measured values are compared with the reference values, and some or all of the operations mentioned above are repeated, if necessary, in a desired order, until the desired rigidity and straightness of the blade (2) have been achieved. The invention also relates to an apparatus for straightening a blade.

11 Claims, 2 Drawing Sheets ns the basis of the treatment is very accurate.
PROCEDURE AND APPARATUS FOR STRAIGHTENING A CIRCULAR-SAW BLADE INTO A DESIRED SHAPE The present invention relates to a procedure as defined in the preamble of claim 1 for straightening a circular-saw blade into a desired shape. The invention also relates to an apparatus as defined in the preamble of claim 6 for straightening a circular-saw blade into a desired shape.

Circular-saw blades lose their original shape during use. The tensions in the blade change during use as a result of mechanical lateral forces and the thermal effects produced by such forces. Depressions are formed in the blade and the blade may get twisted, leading to a deteriorated sawing result. So far, the straightening of circular-saw blades has usually been performed manually by hammering, which means that the quality of work has been dependent on the craftsmanship of the person carrying out the operation. Manual straightening takes time and a successful result is not guaranteed. Moreover, different circular-saw blades having different damages require different treatment. An advantageous circular-saw blade design is one with a slightly 'cup-like' shape, i.e. with a slightly curved cross-sectional form. When the blade is rotated at nominal speed, its cuplike shape is straightened. The cup-like shape varies depending on things like the size and material of the blade and the rotational speed it is designed for. Also, manual straightening and repair of blades whose thickness is reduced radially from the centre towards the edges of the blade has been very difficult, even impossible.

Some devices for straightening a circular-saw blade are also known. From EP application 0521824 A1, a machine for straightening a circular-saw blade is known in which the straightening is effected by means of rollers placed on opposite sides of the blade and controlled on the basis of a measurement performed by means of a dial indicator. Again, U.S. Pat. No. 3,964,348 presents a procedure and machine for the tensioning and straightening of a circular-saw blade, in which dents are straightened by hammering with a hammering device. The blade is hammered from one side only. Among the drawbacks of the solutions known in the art is the inaccuracy of the measurement used for controlling the straightening treatment. In the known solutions, the straightening treatment is performed in a random order, and this has led to unsatisfactory straightening results. Furthermore, treating the blade with rollers and hammers creates unnecessary tensions or expansion of the blade, and these have a deteriorating effect on the final result of the treatment.

The object of the present invention is to achieve a completely new type of procedure and apparatus for straightening circular-saw blades into a desired shape, avoiding the drawbacks of the solutions previously known in the art.

The invention is characterized by what is presented in the claims.

The solution of the invention has several significant advantages. The procedure of the invention can be used to automatically straighten circular-saw blades without the need for special skill. The procedure is fast and accurate. It makes it possible to achieve a straightened and tensioned circular-saw blade having a maximal rigidity, which also remains very accurately in alignment while rotating. Blades repaired by applying the procedure and apparatus of the intention are tested in conditions corresponding to an actual operating situation, ensuring that they will also work properly in their real place of use. The measurement of blade geometry forming the basis of the treatment is very accurate. The tools used in the treatment produce a very accurate effect on the blade.

This means that unnecessary tensions and expansion of the blade are avoided. The blade is mounted in a manner corresponding to its mounting on a real sawing machine. The behaviour of the blade can be observed while it is rotating at a correct speed. The procedure and apparatus of the invention make it possible to produce a report giving blade-specific information about the faults detected and corrected as well as about the repair operations performed. Moreover, information about the repaired blade is obtained, e.g. relative rigidity, surface hardness, size of saw kerf/side clearance, straightness and magnitude of vibration/critical speed of rotation. The blade can be marked with these data, making it easy to select a blade that best suits the sawing situation.

Figure 2:
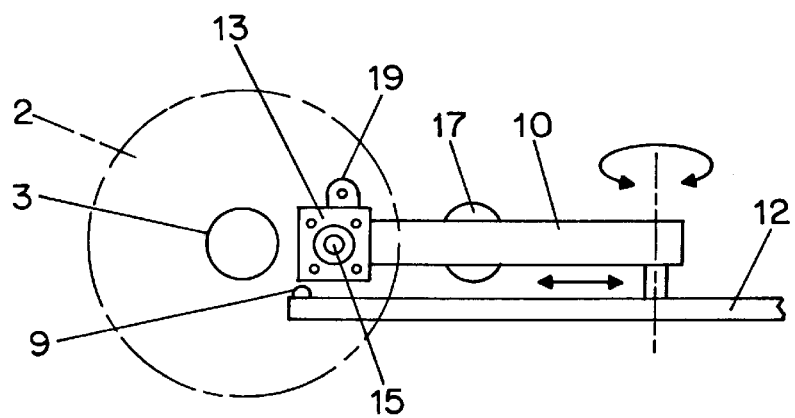
Figure 3:
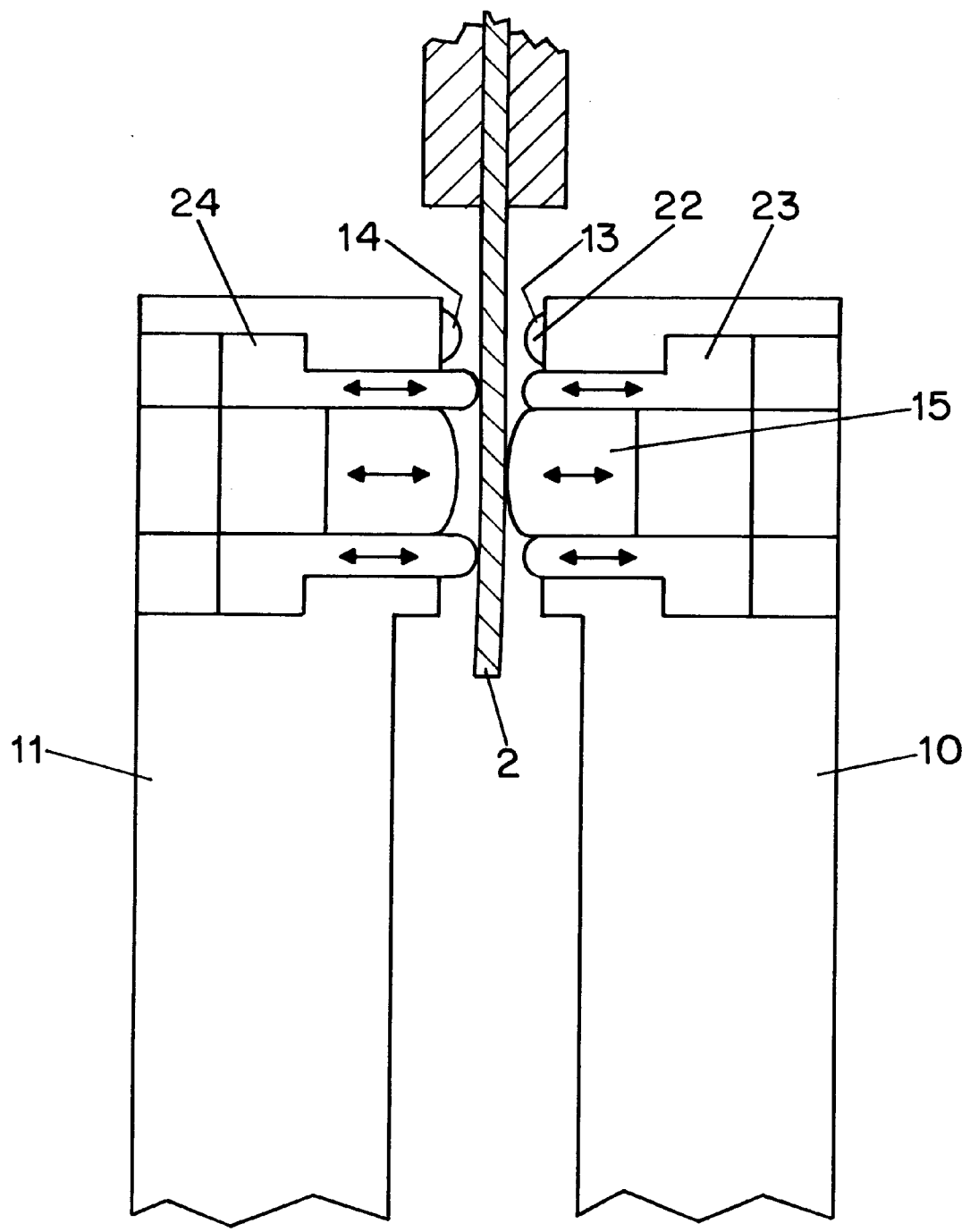

In the following, the invention is described by the aid of examples of preferred embodiments by referring to the attached drawings, in which FIG. 1 presents a top view of an apparatus as provided by the invention, FIG. 2 presents a detail of a blade treating element used in the apparatus of the invention, seen from the direction of the blade, and FIG. 3 presents a detail of the blade treating elements in a diagrammatic form, partly sectioned.

The figures show an apparatus as provided by the invention for straightening a circular-saw blade into a desired shape and for tensioning the same. The circular-saw blade 2 is mounted on a shaft 3, between flanges 4, 5 on the shaft. The manner of mounting the blade corresponds to normal mounting of the blade on a circular saw. The shaft 3 preferably consists of two parts. The shaft 3 is rotatably mounted with bearings on the frame 1 of the apparatus. The shaft is rotated by means of a drive 6, such as am electromotor. The shaft is provided with a detector 7 which transmits the angular position of the shaft 3 to a control unit 8. By means of the control unit 8, the shaft 3 and therefore the circular-saw blade 2 can be rotated by the drive precisely to the desired position.

The apparatus is provided with elements 9 for determining the geometry of the blade. Using a measuring device 9, the shape, possible deflections, dents and convexity/concavity of the circular-saw blade 2 are determined. The measuring elements consist of e.g. at least one sensor 9, the sensor 9 or the blade 2 or both being moved in relation to each other so that substantially the whole surface of the blade is measured. Measurement of shape is an ordinary task for a person skilled in the art, so the shape of the blade can be measured using any known method or detector. It is possible to use e.g. laser measurement to determine the shape of the blade 2 and transit it further to the control unit 8. The sensor 9 is preferably attached to a support 12 which is movable at least in the radial direction of the blade 2, permitting the whole blade area to be measured by simultaneously rotating the blade 2.

In addition, the apparatus comprises blade treating elements for correcting any deformations, such as dents and deflections, as well as means for tensioning the blades. These elements preferably consist of arms 10, 11 placed on opposite sides of the blade, the blade 2 to be treated being located between the arms. The arms 10, 11 are preferably pivoted on the support 12, which is movable at least in a direction transverse to the axis 3 of rotation of the blade (e.g. in the radial direction of the blade). The support 12 can be moved e.g. on guide rails 20 by means of a motor 21. The arms 10, 11 are provided with blade treating elements 13, 14, 15, 16, 23, 24 placed at the arm ends closer to the blade. The blade treating elements consist of working devices 13, 14 and/or shaping devices 15, 16, 23, 24. The working devices 13, 14 preferably consist of surfaces formed in the arms 10, 11, designed to apply a force to the blade 2 by means of actuating devices 17, 18. The shaping devices 15, 16, 23, 24 comprise a press part 15, 16 and a counter press part 23, 24, at least one of which is adjustable. The shaping device is e.g. a hydraulically operated mandrel. The arms are moved by means of the actuating devices 17, 18, which are e.g. piston-cylinder combinations operated by means of a pressure medium, preferably electrohydraulic servo cylinders. The moving mechanism is controlled by means of the control unit 8. The arms 10, 11 are preferably moved together so that they are moved to the desired location on the blade 2 with the arms located on opposite sides of the blade 2. At least one of the arms 10, 11 is brought into contact with the surface of the blade 2, whereupon it is moved preferably in a direction perpendicular to the blade surface so that the desired straightening movement is produced.

The working devices 13, 14 are preferably provided with protuberances 13, 14 protruding from their surface. The press part 15, 16 of the shaping devices is surrounded by a preferably annular projection 23, 24 slightly protruding from the surface of the blade treating elements, said protection acting as a counter press element while the blade is being shaped from the opposite side.

In addition, the apparatus comprises elements 19 for applying a load on the blade 2, especially in the axial direction. These elements consist of at least one nozzle 19 through which a jet of compressed air is directed at the blade 2, preferably in a direction perpendicular to the lateral surface of the blade. The compressed air is supplied to the nozzle via ordinary air supply means from a compressed-air source, such as a compressor (not shown). The nozzle 19 is placed near the blade 2, e.g. on an arm 10, 11, at the arm end closer to the blade.

The process of straightening the blade to a desired shape and tensioning it is e.g. as follows. The blade 2 is fixed onto the shaft, between the flanges 4, 5 provided for this purpose. This manner of mounting the blade essentially corresponds to a normal circular-saw operating situation. The blade 2 mounted on the shaft is rotated slowly, e.g. 10~100 r/min, by means of the drive 6. The geometry of the blade 2 is measured by means of a measuring device 9 preferably mounted on the support 12 at least on one side of the blade 2. Determining the blade geometry includes the measurement of the blade's diameter, number of teeth, tooth shape, number, shape and location of cleaning teeth, as well as the measurement of possible cut-outs in the blade, such as thermal gaps, and blade thickness and defects of shape. After the blade geometry has been determined, the measured results can be displayed on a monitor connected to the control unit 8. The measuring device 9 used may consist of any known system that can be connected to the control unit 8. The most suitable measuring system is laser measurement. The measurement is preferably performed on both sides of the blade 2, which makes it possible to achieve a geometric analysis of even blades that have a cross-sectional form tapering in the radial direction towards the circumference. The yield strength of the blade 2 is preferably determined by applying a shaping test to the blade by means of the shaping devices on the arms 10, 11 and measuring the effects of the shaping on the blade. The apparatus also preferably comprises a device for hardness measurement (not shown) to allow the hardness of the blade to be determined. A hardness measurement is performed on several points in the lateral surface of the blade. The hardness of the blade has a substantial influence on the determination of the working resistance/yield strength of the blade. After the measurements, the blade 2 is straightened into the desired shape.

The straightening is performed using blade treating elements, preferably arms 10, 11 moved by drives and special shaping devices 15, 16, 23, 24 mounted on the arms. Larger deflections are straightened by means of the arms 10, 11 and the working devices 13, 14, and depressions and dents in the blade 2 by means of the shaping devices 15, 16, 23, 24. During the straightening shaping process, an arm on the opposite side of the blade 2, preferably a counter press element 24 of the shaping device on the arm, pushed out into an outer position, the press element 16 of the shaping device on said art being in an inner position, acts as a stop face, preferably a circular one, supporting the blade. When the arm on the opposite side of the blade, preferably the press element 15 of the shaping device on it, is pushed out into an outer position and the counter press element 23 is in its inner position. By forcing the arms 10, 11 by means of actuating devices, preferably servo cylinders, in a controlled manner towards each other, a dent or bump in the blade 2, brought into the region of the gap of the counter press element 24, can be pressed so as to straighten it by applying such pressure to one or more points on the blade, depending on the extent of the dent/bump. The aim of the straightening process is that, when rotating at nominal speed, the blade 2 is substantially perpendicular to the axis 3 of rotation. Tensioning of the blade body is usually started when the circumference of the blade is rotating in the same plane with the centre. After the straightening, the blade is tensioned by means of the shaping devices 13, 14 so that a maximum rigidity is achieved with the rotational speed used. A tension is created by pressing the blade body by means of cylinders from both sides, causing the protrusions 22 of the shaping devices 13, 14 to be pressed against each other. The shape of the tool 13, 14 is such that the working takes place in the direction of the circumference, so that even the smallest deformation produces a sufficient increase in the tension. The elements used to treat and shape the blade are placed on arms 10, 11 moved by servo cylinders, by means of which it is possible to achieve very accurate treatment. Therefore, the procedure produces no unnecessary tension or blade Mansion as when rollers or conventional hammers are used. After the tensioning, while rotating at nominal speed, the blade 2 is subjected to a lateral load e.g. by applying a air blast to it. This is preferably achieved by using a nozzle 19 to which compressed air is supplied via suitable piping (not shown) e.g. from a compressor. Nozzles may be provided on both sides of the blade. The effects of the air blest load are monitored by means of a measuring device 9, preferably the same laser measurement device used for measuring the blade shape as described above. The measuring device preferably monitors the displacement of the blade.

The measuring, tensioning and straightening operations described above are repeated several times if necessary, controlled by the control unit 8, until a circular-saw blade 2 is obtained that has the greatest possible rigidity and remains most accurately in alignment while rotating. In this manner, by repeating treatment operations, the load resistance of the blade body can be optimized. The measuring, bending and tensioning operations are repeated until the displacements in the loading tests are at a minimum. This optimization of fitness and rotational stability is the most significant advantage of the procedure and apparatus of the invention.

The control unit 8, e.g. a PC, regulates the operating elements of the apparatus in the desired manner. The control unit is supplied with reference values with which it compares the measured values and which form the basis on which the required operations are performed. The control unit preferably controls the apparatus in such a way that defects requiring correction in the first place, such as large deflections and bumps, are treated first. In addition, the control unit is preferably so designed that it will take the effect of a treatment operation on other defects in the blade into account. In a preferred case, the control unit is equipped to collect and analyze data about the blades treated by the apparatus, thus continually expanding the reference material. In this case, the procedure and apparatus of the invention have a self-teaching capability.

It is possible to print out from the control unit a blade-specific report indicating e.g. defects discovered in the blade and corrective treatment applied to it. The properties of the straightened blade that can be printed out include relative rigidity, surface hardness, saw kerf/side clearance, straightness and magnitude of vibration/critical speed of rotation. Based on these data it will be easy to select a blade that best suits each sawing situation.

It is obvious to a person skilled in the art that the invention is not restricted to the embodiments described above, but that it may instead be varied in the scope of the following claims.

What is claimed is:

1. Procedure for straightening a circular-saw blade having a known set of blade property reference values, in which procedure the blade is mounted on a shaft between restraining members, in which procedure
    (1) the geometry of the blade is measured by means of a measuring device to obtain a first set of blade property measured values,
    (2) the first set of measured values are compared with the reference values,
    (3) the straightening is controlled by a control unit on the basis of the measured values and the reference values,
    (4) deformations in the blade are straightened by means of blade treating elements,
    (5) the blade is tensioned by means of working devices, further characterized in that,
    (6) the blade is rotated at a normal sawing speed,
    (7) lateral forces are applied to the blade,
    (8) the effect of the forces on the blade is measured while the blade is rotating to obtain a second set of blade property measured values,
    (9) at least one of the sets of blade property measured values are compared with the reference values to determine if the measured values are within a desired tolerance of corresponding reference values, and
    (10) if one or more of the measured values is not within the desired tolerance of the corresponding reference value, at least one of steps (1)–(9) is repeated in a desired order, until the desired rigidity and straightness of the blade have been achieved.

2. Procedure as defined in claim 1, characterized in that the geometry of the blade is measured from both sides of the blade.

3. Procedure as defined in claim 1, characterized in that lateral forces are applied to the blade by blasting with compressed air.

4. Procedure as defined in claim 1, characterized in that at least one of the yield strength and hardness of the blade is determined before the straightening.

5. Procedure as defined in claim 1, characterized in that the control unit is programmed:
    (1) to collect the sets of blade property measured values;
    (2) to direct straightening and tensioning treatment of the blade;
    (3) to compare the sets of measured values with the corresponding reference values;
    (4) to determine if the measured values are within a desired tolerance of the corresponding reference values; and
    (5) if any measured value is not within the desired tolerance of the corresponding reference value, the control unit is programmed to direct further straightening and tensioning treatment of the blade in accordance with the difference between the measured value and the corresponding reference value.

6. Apparatus for straightening a circular-saw blade, in which apparatus the blade is placed on a shaft rotatably mounted with bearings, which apparatus is provided with means for straightening the blade, said means being placed on both sides of the blade, and with at least one measuring device for the measurement of the shape of the blade, said means for straightening the blade consisting of arms mounted on a movable support member, said arms being movable at least in the radial direction of the blade, and at least one blade treating element, characterized in that
    the blade treating elements comprise working devices and shaping devices for changing a property of the blade by contacting a lateral surface of the blade, and that
    a control unit controls the operation of the blade straightening means on the basis of measured values transmitted by the measuring device.

7. Apparatus as defined in claim 6, characterized in that the apparatus further comprises means for rotating the blade at a substantially normal sawing speed.

8. Apparatus as defined in claim 6, characterized in that the working devices consist of surfaces formed in the arms, said surfaces being used to produce a mechanical effect on the blade in accordance with actuation applied by arm actuators.

9. Apparatus as defined in claim 6, characterized in that the shaping device comprises a press element and a counter press element, at least one of which is adjustable.

10. Apparatus as defined in claim 6, characterized in that the apparatus comprises means for applying a load on the blade, said load having a substantial component that is parallel to the axis of rotation of the blade.

11. Apparatus as defined in 6, characterized in that the apparatus comprises means for applying an air blast load to the blade.

* * * * *